Nov. 25, 1930.   F. S. CARLILE   1,782,984
BATTERY COVER
Filed Dec. 6, 1928
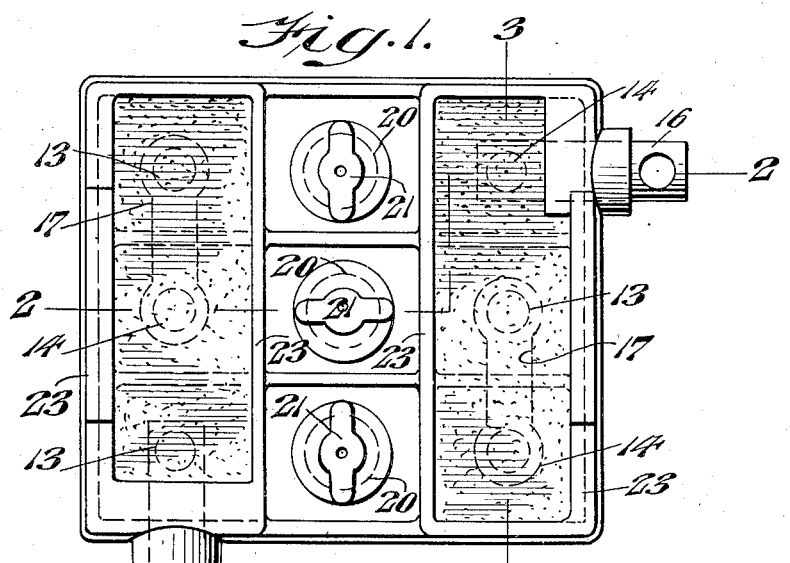
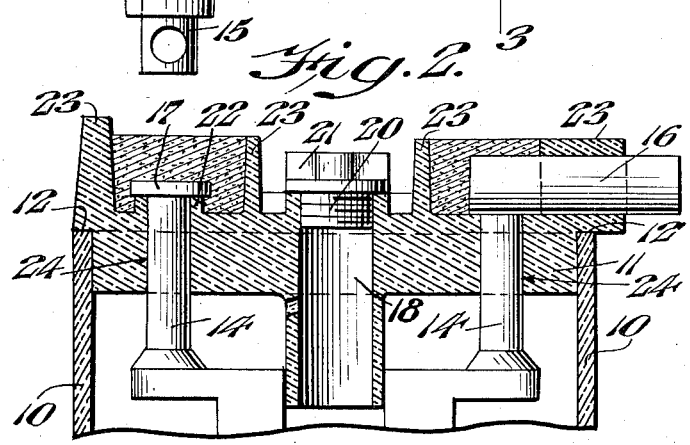
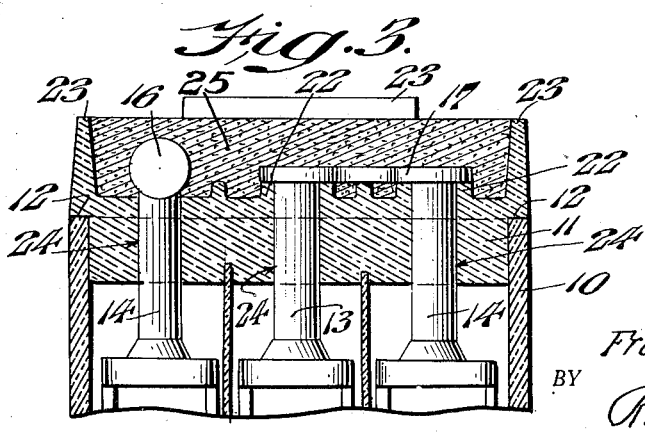
INVENTOR.
Frank S. Carlile,
BY
Robert M. Barr.
ATTORNEY Patented Nov. 25, 1930

1,782,984

UNITED STATES PATENT OFFICE

FRANK S. CARLILE, OF ABINGTON, PENNSYLVANIA

BATTERY COVER

Application filed December 6, 1928. Serial No. 324,207.

The present invention relates to storage batteries and more particularly to a cover construction therefor.

A common source of trouble in storage batteries is the seepage of acid through the joint, between the battery posts and the cover which is caused by the difficulties experienced in providing an air-tight, acid-proof seal. Trouble of this kind occurs more frequently in connection with one-piece covers than it does in batteries wherein each cell is provided with a separate cover, but this multi-cover construction is not well adaptable for small compact batteries, such as is used more particularly for motor cycles.

Some of the objects of the present invention are to provide an improved cover construction for storage batteries; to provide an improved post and cover seal for storage batteries; to provide a cover for a storage battery wherein the pole posts and terminals are embedded with all joints concealed and effectually sealed against acid leakage; to provide a cover construction wherein exposed posts and terminals of one end of a plurality of cells are embedded in a sealing compound confined in a receptacle and separate from a like receptacle containing a sealing compound embedding the posts and terminals of the other end of the same cells, and to provide other improvements as will hereinafter appear.

In the accompanying drawings Fig. 1 represents a plan of a storage battery having a cover embodying one form of the present invention; Fig. 2 represents a section on line 2—2 of Fig. 1; and Fig. 3 represents a section on line 3—3 of Fig. 1.

Referring to the drawings one form of the present invention is shown as applied to a storage battery box 10 and consists preferably of a one piece cover 11 seating snugly within the open top of the box 10 and having a continuous marginal flange 12 seating upon the rim of the box 10. As here shown the box 10 encloses three battery cells, the respective plates of which are suspended from the cover 11 by the positive and negative posts 13 and 14, and these latter are connected together in the ordinary manner, namely by electrically bonding the positive post 13 of one end cell to an exteriorly projecting terminal 15; the negative post 14 of the other end cell to an exteriorly projecting terminal 16; and similarly uniting the adjacent pairs of positive and negative posts by conducting links 17.

Access to each cell is had by way of a passage 18 passing through the center portion of the cover 11 and preferably terminating in an internal extension which has its outlet end in close proximity to the top of the plates of the cell and also the surface of the electrolyte or solution in the cell. These passages 18 serve as filling means and for replenishing the cells with water, and each is closed by a vented closure plug 20 which has screw thread connection with the wall of the passage. Preferably these plugs 20 are each formed with a gripping lug 21 extending diametrically thereof to serve as a means for readily turning the plug when inserting or removing it.

In order to provide a cover 11, preferably of one piece construction, which is proof against leakage or the creeping out of acid from the inside of the battery by way of the joints between the posts 13 and 14 and the cover 11, the molding pattern for the cover 11 is such as to form a plurality of annular bosses 22 and two substantially rectangular upstanding walls 23. The bosses 22 are respectively concentric with the through holes 24 for the posts 13 and 14 and serve to seat the links 17 so that the joint of each post with the cover material is closed at the top and any acid creeping to this location will be caused to take a course at right angles and thus make its escape practically impossible. Also the through holes 24 are molded of less diameter than the posts and the latter are assembled by forcibly pushing them into the holes while the cover material is in an unset condition. As a result each post is tightly gripped by the set of the cover material and a practically leak-proof joint obtained. The two walls 23 respectively bound the two end portions of the cover which include two posts connected by a link 17 and a post connected to an exterior terminal, and the height of these walls is such as to form a deep receptacle at each end of the cover. That portion of each wall 23 through which the terminals 15 and 16 project is of increased thickness to effectively resist any strain to which these terminals are subjected.

When the cover and its associated parts have been molded and connected together, a sealing compound 25 is poured into the two receptacles formed by the walls 23 and they are filled flush with the top to completely embed the links 17 and terminal parts 15 and 16. Thus a complete unitary cover is provided the top of which comprises two level surfaces and an intermediate transverse groove in which the plugs 20 are located and protected by the receptacle wall construction. The sealing compound 25 may be any of kind suitable for the purpose and adaptable to cohere and set in leak-proof relation with the parts of the cover which is of suitable non-corrodible relatively regid but resilient material such as hard rubber or the like.

It will now be apparent that a battery cover construction has been devised wherein a sealing connection is provided for the posts and terminals which is leak-proof and yet embodies the desirable features of resiliency to absorb and cushion shocks, vibrations and the like. Also the arrangement is such that cracking of the sealing compound is prevented as well as injury to the internal conductors and plate parts. While the invention applies more particularly to a one-piece cover for use with compact portable batteries it is not to be strictly limited in this respect as obviously its scope is general to any type of storage battery.

Having thus described my invention, I claim:

1. A battery cover having projecting cell posts and filling openings therethrough, certain of said posts being interconnected by a link, a continuous wall formed integral with said cover and having one portion between said posts and filling openings, said wall enclosing all of said posts to form a relatively deep receptacle, and a sealing compound in said receptacle embedding and concealing said posts and link.

2. A battery cover having filling openings and post holes therethrough, bosses formed integral with the top face of said cover and respectively encircling said post holes, cell posts projecting from said post holes and bosses, certain of said posts being interconnected by a link, a continuous wall formed integral with said cover and having one portion between said posts and filling openings, said wall enclosing all of said posts to form a relatively deep receptacle, and a sealing compound in said receptacle covering said bosses, said posts and said link.

3. A battery cover having filling openings and a row of post holes at each side thereof, cell posts in said post holes, certain of said posts being interconnected by a link, two continuous walls formed integral with said cover and each having a portion between the filling openings and one set of the post holes, said walls forming two receptacles spaced apart, and a sealing compound in both receptacles embedding and concealing said posts and link.

4. A battery having two rows of cell post holes and a row of filling openings therebetween, a wall encircling one row of post holes to form a receptacle at one side of said filling openings, a second wall encircling the other row of post holes to form a second receptacle at the other side of said filling openings, sealing compound filling each receptacle, and cell posts located respectively in said post holes and anchored in position by said compound.

Signed at Philadelphia, county of Philadelphia, State of Pennsylvania, this 30th day of Nov., 1928.

FRANK S. CARLILE.